Oct. 14, 1941.   J. H. BUCKNAM ET AL   2,258,739
WELDING
Filed Oct. 31, 1939   2 Sheets-Sheet 2
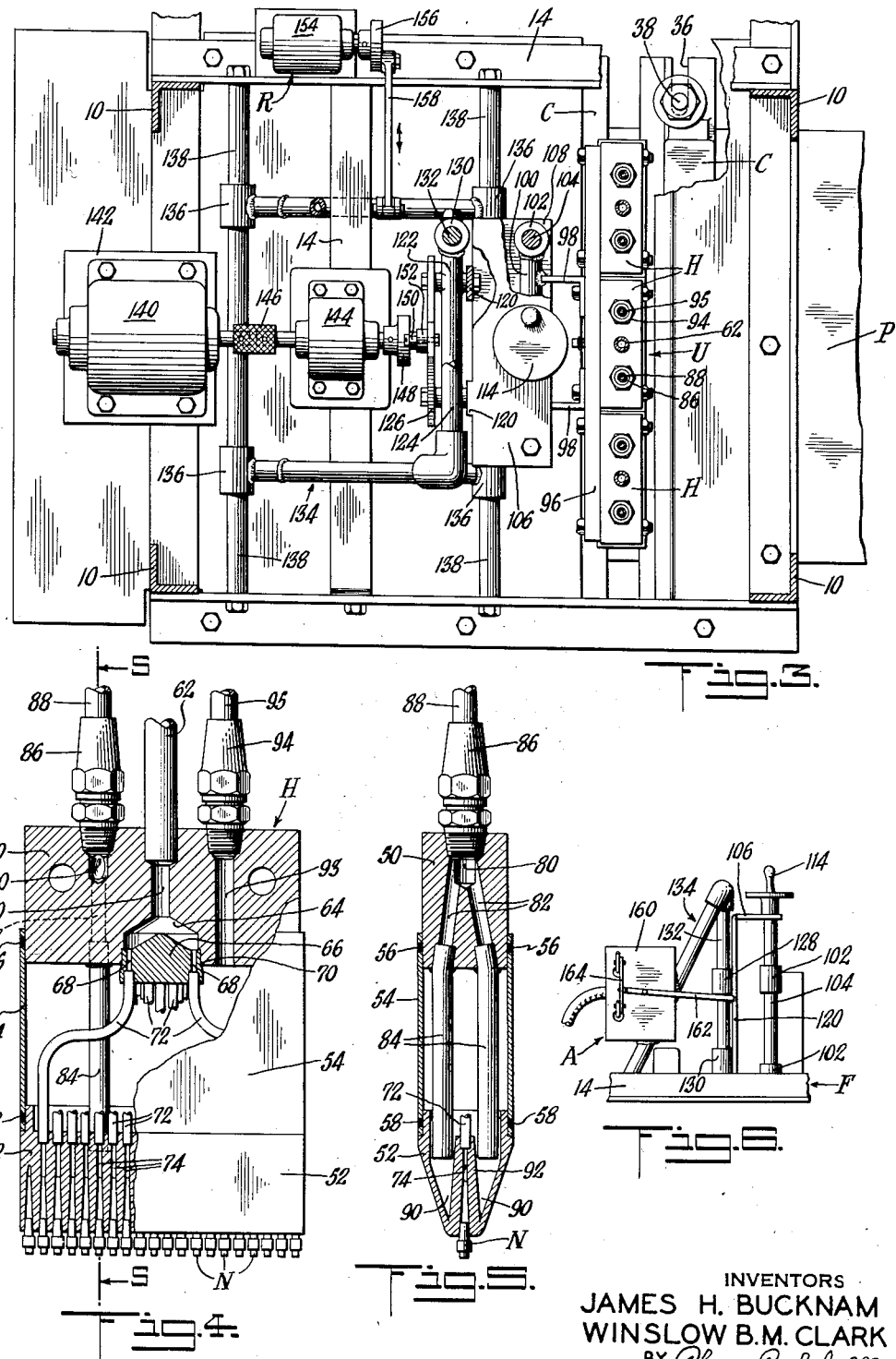
INVENTORS
JAMES H. BUCKNAM
WINSLOW B. M. CLARK
BY Chas. E. Scheffler
ATTORNEY Patented Oct. 14, 1941

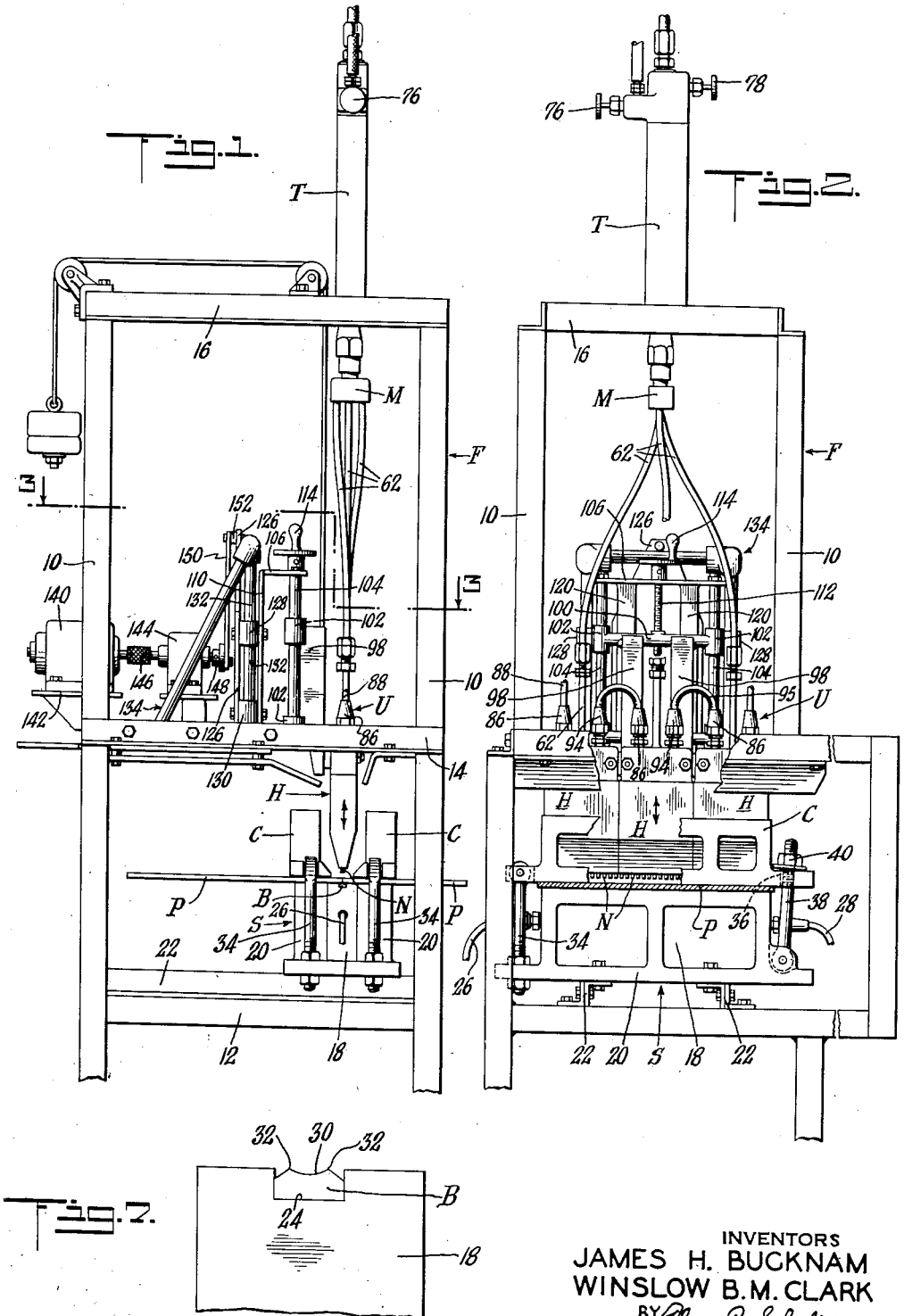

2,258,739

UNITED STATES PATENT OFFICE 2,258,739

WELDING

James H. Bucknam, Cranford, and Winslow B. M. Clark, Roselle, N. J., assignors to The Linde Air Products Company, a corporation of Ohio Application October 31, 1939, Serial No. 302,100

8 Claims. (Cl. 113—59)

This invention relates to welding. More particularly, the invention relates to a method of simultaneously welding an entire seam by the oxy-fuel gas welding process and to an apparatus for performing such method.

In many modern manufacturing processes, speed in the formation of welded joints is of paramount importance. One type of welding which is generally used for the high speed formation of welded seams or joints is the so-called electric flash welding process. In this process, the metallic members to be weld united are arranged with their adjacent edges in abutment and a heavy electric current is passed through the members and across the abutting edges. As these edges are not in perfect contact, considerable resistance to the flow of electric current thereacross is developed. This resistance causes heating and resultant fusion of the abutting edges, which thereupon become weld united.

While electric flash welding is satisfactory from a speed standpoint, the resultant welded seam or joint is not entirely satisfactory. The weld metal is in a hardened condition and the flash must be removed to provide a finished joint.

On the other hand, welded joints formed by the oxy-fuel gas welding process are characteristically of high tensile strength, ductile and soft, but the welding speed usually is of a relatively low order. In order to increase the speed of welding using the oxy-fuel gas welding process, it has been proposed to provide an apparatus comprising movable welding units simultaneously traversing different portions of the seam to be welded. While the speed of welding has been increased to a certain extent by this means, further increase in speed is necessary for practical and commercial reasons.

Attempts have heretofore been made to simultaneously weld an entire seam by the oxy-fuel gas welding process but have generally been unsuccessful due to lack of understanding of the necessary factors to be considered. Such welds, as heretofore formed, have been imperfect due to inadequate penetration, lack of proper fusion, irregular contour, and other causes.

High speed welding is of particular importance in the production of sheet steel, which material is at present being produced in great part by the continuous strip mill process. In this process, sheet steel is produced by rolling out the white hot ingot into strips varying from 20 to 100 inches in width and approximately 150 to 500 feet in length. Upon emerging from the hot finishing mills, these long hot rolled strips are wound into coils and sent to the cold finishing mills.

Before the cold rolling operation, the strips are unwound, stitched together, passed through a continuous pickling bath and washed in cold water. Formerly, the stitching formed merely a temporary joint, which was usually of the overlap type, and had to be removed before the strips were cold rolled; as the stitched joint would not stand the strain imposed on the strips during cold rolling.

At present, the successive coils of strip are united by means of welded joints, and in order not to delay the production of the strip material, the joints must be formed at great speed. Electric flash welding is usually resorted to because of the rapidity of this operation. However, as previously explained, an electric flash weld is hard and requires subsequent removal of the flash. The hard metal of the weld tends to mar and otherwise damage the cold rolls, and the flash removal operation materially interferes with high speed production. Welds formed by the oxy-fuel gas process are entirely satisfactory in steel strip production, but the slow rate of welding has hitherto prevented adoption of this process in continuous strip mills where operating cycles are short.

It is therefore among the objects of this invention to provide a method of simultaneously welding an entire seam by the oxy-fuel gas welding process, in which the resultant seam is of high tensile strength and the weld metal is soft and ductile. Another object is to provide an apparatus for performing such method.

These and other objects of the invention will in part be obvious and in part become apparent from the following description and the accompanying drawings, in which:

Fig. 1 is a side elevational view of one form of apparatus embodying the principles of the invention;

Fig. 2 is a front elevational view of the apparatus shown in Fig. 1;

Fig. 3 is a plan view of the apparatus on the line 3—3 of Fig. 1;

Fig. 4 is a side elevational view, partly in section, of a multi-flame heating head forming part of the apparatus shown in Figs. 1–3;

Fig. 5 is a sectional view on the line 5—5 of Fig. 4;

Fig. 6 is a front elevational view of a control element forming part of the invention; and Fig. 7 is an enlarged end view of a work support forming part of the invention.

In practicing the method of the present invention, the members to be welded, which may be metallic plates or strip material, are placed with the edges to be joined in abutting or substantially abutting relation. The members are held firmly in position by suitable clamping means, and a backing or chill bar of copper or other suitable material of relatively high heat conductivity is placed beneath and in alignment with the juxtaposed edges. The backing or chill bar is formed with a longitudinally extending depressed surface portion or recess in its upper surface, and the longitudinal center line of this recess coincides with the line of intersection of the workpieces.

When the workpieces have been thus supported and fixed in position, a series of oxy-fuel gas heating flames is impinged simultaneously upon the meeting edges of the members throughout substantially the entire length of the meeting edges, and this series of flames is oscillated or reciprocated longitudinally of the edges until the metal of the juxtaposed edges fuses, commingles and drops slightly into the recess or groove in the backing or chill bar. When this occurs, the heating flames are withdrawn so that only the outer envelopes of the flames contact the work, and so maintained until the fused metal solidifies in order to maintain a reducing atmosphere adjacent the weld metal. When the welded joint has completely solidified, the heating flames are extinguished and the clamping means are released, thereby completing the operation.

In order to insure a satisfactory welded seam between the workpieces, certain critical factors such as the heating time, flame intensity, distance from the flames to the work, the amount of oscillation, distance of clamps from the adjacent edges of the workpieces, and the depth and contour of the recess in the backing or chill bar, must be taken into consideration. These several factors are dependent upon the thickness and composition of the work, and will be discussed more fully hereinafter.

The form of apparatus illustrated in the drawings comprises a main frame F upon which is mounted a work supporting means S. The plates or workpieces P are held in proper relation on the support S by means of movable substantially parallel clamps C, and a grooved backing or chill bar B is disposed on support S beneath and in longitudinal alignment with the juxtaposed edges of plates or workpieces P and substantially parallel to clamps C.

Mounted on the frame F for vertical displacement and adjustment and horizontal reciprocation or oscillation is a suitable oxy-fuel gas heating unit U. This heating unit may comprise one or more multi-flame heating heads H, each provided with a series of closely spaced nozzles N disposed in longitudinal alignment with the line of intersection of the workpieces P. A mixture of a combustible gas, such as acetylene, and a combustion-supporting gas, such as oxygen, may be supplied to the heads H from a blowpipe or torch T through a suitable common manifold M. A mechanism R is provided for oscillating or reciprocating the unit U longitudinally of the edges to be weld united. Desirably, an automatic control means A (Fig. 6) is provided to insure uniformity of operation of the apparatus in making successive welds.

Referring more specifically to the drawings, the main frame F may be constructed of suitable vertical members or columns 10 connected by cross members or braces 12, 14, and 16. The support S, which comprises a central section 18 and lateral sections 20, is secured to the lower member 12 by brackets 22. The central section 18 is desirably made hollow to receive cooling fluid, and its upper surface is formed with a groove 24 to receive interchangeably the backing or chill bars B, the dimensions of which vary in accordance with the thickness of the workpieces P. Cooling fluid may enter the interior of section 18 through a suitable conduit 26 and may be withdrawn through another conduit 28.

The upper surfaces of the lateral sections 20 are at the same level, and the workpieces P are supported upon these sections with their opposed edges in abutting or substantially abutting relation and in alignment with a depressed surface portion or groove 30 in the upper surface of the bar B. This groove is so formed that contact edges 32 are formed on either side thereof, one edge engaging each workpiece. The depth of the groove and the spacing of the contact edges is dependent upon the thickness of the workpieces as will appear more fully hereinafter.

The clamps C for holding the work firmly in correct relation are pivotally connected to the sections 20 of support S in such a manner that they may be swung both vertically and laterally away from the support and also adjusted a slight distance laterally with respect to the line to be welded. This lateral adjustment is necessary as, for optimum results, the lateral spacing of the clamps is a function of the thickness of the work.

Each clamp C is pivotally connected at one end to a bolt 34 rotatably and vertically adjustably secured to one of the sections 20. The pivotal connection of the clamp to the bolt permits limited lateral movement of the clamp along the pivot, as may be seen by reference to Fig. 1. At its opposite end, each clamp is slotted, as at 36, to receive a bolt 38, swingably connected to support S, and provided with suitable clamping means 40, which may be a washer and nut. By vertical adjustment of bolts 34 on support S and adjustment of clamping means 40, the clamps C may be urged into firm engagement with the work.

The heating unit U, which is mounted for vertical adjustment and displacement and longitudinal reciprocation on the frame F, includes a series of multi-flame heating heads H, of which a sufficient number are provided in tandem so that the series of nozzles N thereof are substantially coextensive with the line to be welded. Referring to Figs. 4 and 5, it will be seen that each head H includes an upper block 50 and a lower block 52, which blocks are united by a shell 54 which may be soldered to the blocks as at 56 and 58. The upper block 50 is formed with a passage 60 countersunk at its upper end to receive one end of a conduit 62 connected at its opposite end to the manifold M of the torch or blowpipe T. At its lower end, passage 60 communicates with an enlarged recess 64 in which is seated a distributing manifold 66 provided with a plurality of passages 68 equal in number to the nozzles N. Manifold 66 may be secured to block 50 by soldering as at 70.

Each passage 68 is countersunk at its lower end to receive one of a series of tubings 72 formed of copper or other suitable material. The opposite end of each tubing 72 is seated in a countersunk portion at the upper end of each of a series of passages 74 formed in block 52 and equal in number to the number of nozzles N. Tubings 72 may be soldered to manifold 66 and block 52. The lower end of each passage 74 is divergent to receive the tapered upper end of a nozzle N in a driving fit.

By the described construction, a combustible mixture may be conducted individually to each nozzle N from manifold M through conduit 62, passage 60, recess 64, passages 68 in manifold 66, tubings 72 and passages 74. The proper proportions of the gases forming the combustible mixture may be adjusted by means of valves 76 and 78 on torch T, and the supply of the gases may be initiated or terminated by suitable quick shut-off valves mounted in a convenient location on frame F and controlled automatically if desired.

Suitable means may be provided for cooling the heads H, and to this end block 50 is formed with an inlet passage 80 having branches 82 in the lower end of each of which is secured one of a pair of conduits 84. A union 86 may be secured in the upper end of inlet 80 for connection to a conduit 88. The block 52 is longitudinally recessed at 90, on either side of a central rib 92 in which rib are formed the passages 74. The lower end of each conduit 84 is disposed adjacent the bottom of one of the recesses 90. Cooling fluid exhausts through an outlet passage 93 in block 50 in which is secured a union 94 connected to a conduit 96. In operation, cooling fluid enters the inlet passage in the left end of the first head H (as viewed in Fig. 2) and passes from the outlet of this head to the inlet of the second head. The cooling fluid thus passes in series through the heads H and thence to the inlet conduit 26 connected to support S. The cooling fluid finally is exhausted from the apparatus through the outlet conduit 28. Suitable flexible connections are provided for the passage of the cooling fluid through the several elements of the apparatus, but for the sake of clarity, some connections have been omitted from the drawings. The flow of cooling fluid may be controlled by a quick shut-off valve mounted at a convenient place on frame F, and preferably adjacent the quick shut-off valves for the gases. Desirably, the fluid control valve may be operated in coordination with the gas control valves.

The heads H are bolted or otherwise secured to a bar 96, which is in turn bolted to angle irons 98. The angle irons are integrally secured, as by welding, to spaced tubular cross members 100, each provided at both ends with collars 102 slidably engaging vertical tubular members 104. The members 104 extend between the upper flange 106 and the lower flange 108 of a channel shaped member 110. A threaded vertical shaft 112, provided with a hand wheel 114, is rotatably mounted in the upper flange 106 and threadedly engages the upper cross member 100. By rotation of hand wheel 114, the heating unit U may be adjusted vertically with respect to the work and the support S.

The web of the channel shaped member 110 comprises horizontally spaced vertical straps 120 each of which is secured to a pair of vertically spaced bars 122, 124. To the opposite side of bars 122 and 124 is secured a plate 126. The bars 122 and 124 are provided at each end with collars 128 and 130, respectively, slidably engaging vertical rails 132 forming part of a tubular framework or slide 134. The framework or slide 134 is formed with integral collars 136 slidably engaging spaced rails 138.

Means are provided for moving the heating unit vertically with respect to the work. As best shown in Figs. 1 and 3, this means includes a motor 140 mounted on a platform 142 forming part of frame F, and driving, through the medium of a flexible coupling 146, a gear reducing unit 144 mounted on one of the cross members 14. A crank 148 is secured to the shaft of unit 144 and a connecting rod 150 is pivotally connected to this crank and to a bearing 152 in the upper end of plate 126. By the described means the heating unit may be moved vertically into and out of operative relation with the work, and this movement is preferably automatically controlled as will appear hereinafter.

As the heating nozzles N of the heads H are necessarily spaced a slight distance apart, it is necessary, in performing the method of the invention, to reciprocate the heads longitudinally of the line to be welded a sufficient distance to insure the direct application of heat to the entire seam. A suitable means for performing this function is the mechanism R, illustrated in Fig. 3 of the drawings, and comprising a motor 156 driving an adjustable throw crank 156. A connecting rod 158 is pivotally connected to the crank and to the slide 134. Rotation of the crank will thus reciprocate slide 134 on the rails 138, causing the heating unit U to reciprocate along the line to be welded a distance of the order of the spacing between the heating flames.

One form of simple automatic control mechanism A is illustrated in Fig. 6. As shown, this may comprise a plate 160 mounted on slide 134, and on which plate control switches (not shown) may be positioned. The control switches may be actuated by an arm 162, pivoted to the plate, and having one end connected to a switch operating bar 164 and the other end interposed in the path of movement of collars 128 and 130. A mercury time-delay switch may be operatively associated with the mechanism A in such a manner that, when motor 140 is energized to lower the heating unit U into operative position, collar 128 will strike arm 162, starting operation of the time-delay switch which controls further energization of motor 140 and reciprocating mechanism R. After a predetermined time interval, the motor 140 will be energized to raise the heating unit to its upper position. In this movement, collar 130 strikes arm 162 to reset the time-delay switch. If desired, the gas and cooling fluid control valves may likewise be automatically operated in a well-known manner through the medium of the switch control A.

In the operation of the above described apparatus in performing the method of the invention, certain factors must be considered before the start of the welding. Among these factors are the thickness of the work, the oxygen working pressure, the welding time, the spacing of the flame tips from the work, the lateral spacing of the clamps, and the amount of oscillation. The relative values of these factors for welding certain thickness of sheet metal are given, for the purpose of illustration only, in the following table:

| Metal thickness gauge No. | 18 | 16 | 14 | 12 | 10 |
|---|---|---|---|---|---|
| Oxygen working pressure lbs. per sq. in. | 25 | 22 | 30 | 28 | 30 |
| Welding time seconds | 7½ | 7½ | 16 | 29 | 31 |
| Welding tip end to chill bar inches | ¾ | ¾ | 13/16 | 13/16 | ⅞ |
| Clamp spacing do | ⅞ | 2 | 2 | 2 | 2 |
| Oscillatory throw do | ¼ | ¼ | ¼ | ¼ | ¼ |

Of these various factors, the oxygen working pressure may be controlled by a suitable regulator attached to the blowpipe or torch T and the welding time may be controlled manually by a stop watch or automatically by the aforementioned mercury time-delay switch. The spacing of the nozzle or tip end from the chill bar may be adjusted through the medium of hand wheel 114 with the heating unit U in its lower position. The clamps C may be adjusted laterally along their pivotal connection with bolts 34, and the oscillatory throw may be adjusted through the medium of adjustable throw crank 156.

In performing the method of the invention, the plates or workpieces P are placed on the support S with their adjacent edges in substantially abutting relation to form a line to be welded. The plates are so placed that the line to be welded is centered over the groove 30 in the chill bar B and a contact edge 32 of the bar is in engagement with such plate. The groove 30 is relatively shallow, being less in depth than the plate thickness. The spacing of the contact edges 32 increases with increasing thickness of the workpieces. The clamps C are then secured in properly spaced position to hold the work in place.

Prior to the above operations, the oxygen pressure will have been adjusted at the regulator and the handwheel 114 will have been used to space the ends of nozzles N at the proper distance from the chill bar. Similarly, crank 156 will have been adjusted to assure the correct amount of longitudinal oscillation of heads H along the line to be welded. The amount of oscillation is dependent upon the spacing of nozzles N and the number of nozzles used is so chosen that the extreme ends of the welding line will not be heated directly. This latter is important as the heat conduction from the ends is less than that from intermediate points due to the smaller mass of metal adjacent the ends. With the welding unit U in its upper position, the gas and cooling fluid control valves are opened and the heating flames lighted and adjusted to the proper proportions. In most applications, the flames are adjusted to be neutral, that is, substantially equal volumes of a combustion-supporting gas, such as oxygen, and a combustible gas, such as acetylene, are supplied to the nozzles N.

Motor 140 is then energized to lower the heating unit U into operative relation to the work. During this movement, collar 128 moves arm 162 to actuate the mercury time-delay switch. At the same time motor 154 is energized to reciprocate the flames longitudinally of the line to be welded. The heating flames, by reason of the reciprocating mechanism R, are impinged against substantially all portions of the edges of the workpieces P.

After a definite time interval, the edges of the work become fused, commingle, and drop into the groove 30 of chill bar B. At this time, the time-delay switch will actuate the motor 140 to withdraw the flames from the work so that only the outer envelopes of the flames contact the work. The flames are maintained ignited until the fused metal solidifies, thus insuring that the outer envelope gas from the flames will form a reducing atmosphere over the fused metal. On heavier work, a carburizing flame may be used at this stage to obtain a better appearing weld. When the fused metal has solidified, the flames are extinguished and the clamps are released, completing the welding operation.

For the best results, the penetration is maintained at a minimum and the zone of penetration is made as narrow as possible. The flames should not be too close to the work in order to prevent overrunning of the metal resulting in a laminated or overlapped weld. Furthermore, the edges of the workpieces should be as straight as possible to obtain good butting throughout the line to be welded. If desired, the chill bar B may be elevated slightly above support S to peak the work, which results in a more satisfactory weld.

The weld obtained by the present process possesses all the good qualities of oxy-fuel gas welds, such as high tensile strength, ductility, and softness, while the speed of welding is of the order of that for electric flash welding. However, there is no hard weld deposit or flash to be removed as is true of electric flash welding. Due to the elimination of subsequent flash removal operations, the weld of the present invention can be made in less total elapsed time than an electric flash weld. Additionally, when the present method is used in a strip rolling operation, no scoring of the cold rolls occurs, because of the softness and ductility of the welded joint. At the same time, the weld possesses sufficient tensile strength to withstand the severe stresses encountered in the cold rolling operation.

While one form of apparatus suitable for performing the method of the invention has been described somewhat in detail in order to afford a clear understanding of the principles underlying the invention, it will be obvious that numerous changes may be made in the method and apparatus disclosed, and certain features may be used apart from others without departing from the principles of the invention or sacrificing the advantages thereof.

What is claimed is:

1. A method of simultaneously welding an entire seam which comprises arranging metallic members to be weld united with their adjacent edges in substantially abutting relation to form a line to be welded; clamping such members in position to be welded; disposing at a short distance beneath such line to be welded means having a high coefficient of heat conductivity; impinging against said line to be welded a series of closely spaced oxy-fuel gas heating flames substantially coextensive in length with such line; oscillating said series of heating flames longitudinally of said line throughout a distance of the order of the spacing between such flames; continuing such heating until the metal of said edges fuses, commingles, and drops onto such means; and thereafter withdrawing the heating flames to permit the fused metal to solidify in contact with such means.

2. In the method claimed in claim 1, the step of maintaining a reducing atmosphere adjacent such fused metal during the solidification thereof.

3. A method of simultaneously welding an entire seam which comprises arranging metallic members to be weld united with their adjacent edges in substantially abutting relation to form a line to be welded; clamping such members in position; supporting such members on a bar formed of metal having a high coefficient of heat conductivity and provided with spaced contact edges engaging said members on either side of said line to be welded and with a depressed upper surface portion directly beneath such line to be welded; providing a series of closely spaced oxy-fuel gas heating flames substantially coextensive in length with such line; adjusting said heating flames to be neutral; impinging said flames simultaneously against substantially the entire length of such line to be welded to fuse said edges and cause the metal thereof to commingle and drop into the depressed surface portion of such bar; thereafter withdrawing the heating flames to permit the fused metal to solidify in contact with said bar while maintaining said heating flames at a sufficient distance from the members to be welded during the solidification of the fused metal that the gases in the outer envelopes of said flames form a blanket over the solidifying metal; and during such time adjusting said flames to be carburizing.

4. Welding apparatus comprising, in combination, means for supporting members to be welded with their adjacent edges in substantial abutment to form a welding line; heat conductive means disposed directly beneath said members and having a depressed upper surface portion aligned with said edges; means for directing simultaneously against substantially the entire length of such welding line a series of closely spaced oxy-fuel gas heating flames, said series of heating flames being substantially coextensive in length with the edges of the members to be welded; and means for oscillating said series of heating flames longitudinally of the edges of said members a distance of the order of the spacing between such heating flames.

5. Apparatus as claimed in claim 4, including means for moving said series of oxy-fuel gas flames into and out of operative relation with the work to be welded.

6. Welding apparatus comprising, in combination, a frame; a support mounted on said frame for supporting members to be welded with their adjacent edges in substantial abutment to form a welding line; parallel clamping means operatively associated with said support; a heat conductive backing bar seated in a groove formed in the upper surface of said support between said clamping means and extending parallel therewith, said backing bar having spaced longitudinally extending work contacting edges and a groove formed in its upper surface between the edges thereof, such groove being disposed directly beneath said members and aligned with the edges of said members; at least one multi-flame heating head disposed above said backing bar, said head being provided with a series of closely spaced nozzles longitudinally aligned with the groove in said bar, said series of nozzles being substantially coextensive in length with the edges of the members to be welded; and means for oscillating said heating head longitudinally of the edges of the members to be welded a distance of the order of the spacing between said nozzles.

7. Apparatus as claimed in claim 6, including means for moving said head into and out of operative relation with members to be welded positioned on said support.

8. A method of simultaneously welding an entire seam which comprises arranging metallic members to be weld united with their adjacent edges in substantially abutting relation to form a line to be welded; clamping such members in position for welding; supporting such members on a bar formed of metal having a high coefficient of heat conductivity and provided with spaced contact edges engaging said members on either side of said line to be welded and with a depressed upper surface portion directly beneath such line to be welded; providing a series of closely spaced oxy-fuel gas heating flames substantially coextensive in length with such line; adjusting said heating flames to be neutral; impinging said flames simultaneously against substantially the entire length of such line to be welded to fuse said edges and cause the metal thereof to commingle and drop into the depressed surface portion of such bar; oscillating said heating flames longitudinally of such line to be welded a distance of the order of the spacing between such flames; and thereafter withdrawing the heating flames to permit the fused metal to solidify in contact with said bar.

JAMES H. BUCKNAM.
WINSLOW B. M. CLARK.